US012709018B2

(12) United States Patent
Wu et al.

(10) Patent No.: US 12,709,018 B2
(45) Date of Patent: Aug. 18, 2026

(54) STATE ESTIMATION FOR LEGGED ROBOT

(71) Applicant: Tencent Technology (Shenzhen) Company Limited, Shenzhen (CN)

(72) Inventors: Yanming Wu, Shenzhen (CN); Wanchao Chi, Shenzhen (CN); Haitao Wang, Shenzhen (CN); Xinyang Jiang, Shenzhen (CN); Shenghao Zhang, Shenzhen (CN); Yu Zheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 195 days.

(21) Appl. No.: 18/612,974

(22) Filed: Mar. 21, 2024

(65) Prior Publication Data

US 2024/0227203 A1 Jul. 11, 2024

Related U.S. Application Data

(63) Continuation of application No. PCT/CN2023/099676, filed on Jun. 12, 2023.

(30) Foreign Application Priority Data

Aug. 17, 2022 (CN) ......................... 202210985184.6

(51) Int. Cl.
*B25J 13/08* (2006.01)

(52) U.S. Cl.
CPC ........... *B25J 13/088* (2013.01); *B25J 13/087* (2013.01)

(58) Field of Classification Search
CPC ...... B25J 13/088; B25J 13/087; G01C 21/165
See application file for complete search history.

(56) References Cited

U.S. PATENT DOCUMENTS

2011/0137461 A1* 6/2011 Kong .................. G05D 1/0274 901/1
2022/0026920 A1* 1/2022 Ebrahimi Afrouzi ........................ G06N 3/0495

FOREIGN PATENT DOCUMENTS

CN 109781117 A 5/2019
CN 110160524 A 8/2019
(Continued)

OTHER PUBLICATIONS

Office Action and Search Report received for Chinese Application No. 202210985184.6, mailed on Mar. 27, 2025, 13 pages (7 pages of original office action and 6 pages of English Translation).
(Continued)

*Primary Examiner* — Wade Miles
*Assistant Examiner* — Mohammed Yousef Abuelhawa
(74) *Attorney, Agent, or Firm* — ARENTFOX SCHIFF LLP

(57) ABSTRACT

In a state estimation method for a legged robot, first sensor information and second sensor information of the legged robot are received. First state information of the legged robot for a period of time is determined, via a first Kalman filter, based on the first sensor information and the second sensor information. Third sensor information of the legged robot is received. Second state information of the legged robot is determined, via a second Kalman filter, based on the third sensor information and the first state information for the period of time. First state information of the legged robot at a current time is updated based on the second state information of the legged robot, to determine state information of the legged robot at the current time.

20 Claims, 5 Drawing Sheets

(56) References Cited

FOREIGN PATENT DOCUMENTS

| | | | | |
|---|---|---|---|---|
| CN | 111086001 | A | | 5/2020 |
| CN | 111811500 | A | | 10/2020 |
| CN | 114046800 | A | * | 2/2022 |
| CN | 114216456 | A | | 3/2022 |
| CN | 115355905 | A | | 11/2022 |

OTHER PUBLICATIONS

International Search Report and Written Opinion received for PCT Patent Application No. PCT/CN2023/099676, mailed on Sep. 13, 2023, 17 pages (6 pages of English Translation and 11 pages of Original Document).

* cited by examiner

STATE ESTIMATION FOR LEGGED ROBOT

RELATED APPLICATIONS

The present application is a continuation of International Application No. PCT/CN2023/099676, filed on Jun. 12, 2023, which is a continuation of Chinese Patent Application No. 202210985184.6, filed on Aug. 17, 2022. The entire disclosures of the prior applications are hereby incorporated by reference.

FIELD OF THE TECHNOLOGY

Aspects of this disclosure relate to the technical field of legged robots, including to a state estimation method for a legged robot, a state estimation apparatus for a legged robot, a computer device, and a computer-readable storage medium.

BACKGROUND OF THE DISCLOSURE

In the related art, a state (for example, position and pose information) of a legged robot usually may be determined through various means in real time during motions of the legged robot. For example, a body state of the legged robot may be estimated through multi-sensor fusion estimation. However, during state estimation by using body sensing-based sensors such as an inertial measurement unit (IMU) and a leg encoder, the legged robot may encounter foot end slipping, deformation, and mechanical structural errors during motion, and noise, drift, and the like of the sensors may affect a state estimation result. Therefore, an estimation value may be inaccurate. As a duration of motions of the legged robot increases, error values accumulate. During control of the legged robot, a current state estimation value is usually required for controlling joint motors, and an inaccurate state estimation value may result in difficulty in accurately controlling the legged robot.

Therefore, the state estimation method in the related art needs to be improved to eliminate error accumulation as much as possible while ensuring real-time obtaining of a state estimation value.

SUMMARY

Aspects of this disclosure provides a state estimation method and apparatus for a legged robot, a computer device, and a non-transitory computer-readable storage medium, which may improve a precision of a state estimation value while implementing real-time obtaining of the state estimation value of the legged robot.

An aspect of this disclosure provides a state estimation method for a legged robot. In the state estimation method, first sensor information and second sensor information of the legged robot are received. First state information of the legged robot for a period of time is determined, via a first Kalman filter, based on the first sensor information and the second sensor information. Third sensor information of the legged robot is received. Second state information of the legged robot is determined, via a second Kalman filter, based on the third sensor information and the first state information for the period of time. First state information of the legged robot at a current time is updated based on the second state information of the legged robot, to determine state information of the legged robot at the current time.

In another aspect, an aspect of this disclosure provides a state estimation apparatus for a legged robot, including processing circuitry. The processing circuitry is configured to receive first sensor information and second sensor information of a legged robot. The processing circuitry is configured to determine, via a first Kalman filter, first state information of the legged robot for a period of time based on the first sensor information and the second sensor information. The processing circuitry is configured to receive third sensor information of the legged robot. The processing circuitry is configured to determine, via a second Kalman filter, second state information of the legged robot based on the third sensor information and the first state information for the period of time. The processing circuitry is configured to update first state information of the legged robot at a current time based on the second state information of the legged robot, to determine state information of the legged robot at the current time.

In another aspect, a legged robot is provided. The legged robot includes at least one leg, a first sensor configured to obtain first sensor information, a second sensor configured to obtain second sensor information, a third sensor configured to obtain third sensor information, and the state estimation apparatus.

In another aspect, an aspect of this disclosure provides a computer device, including an input interface and an output interface, and further including: a processor, adapted to execute one or more instructions; and a computer-readable storage medium, the computer-readable storage medium having one or more instructions stored therein, the one or more instructions being adapted to be loaded and executed by the processor to perform the above state estimation method for a legged robot.

In another aspect, an aspect of this disclosure provides a non-transitory computer-readable storage medium storing instructions which when executed by a processor cause the processor to perform the above state estimation method for a legged robot.

In another aspect, an aspect of this disclosure provides a computer program product, including a computer program, the computer program, when executed by a processor, implementing the above state estimation method for a legged robot.

According to the aspects of the aspects of this disclosure, output information of different sensors operating at different frequencies is fused, and problems such as different frequencies and delays during the fusion of the different sensor information are resolved by using two Kalman filters, thereby achieving highly real-time multi-sensor state fusion estimation with high robustness and high efficiency, and significantly reducing error accumulation as a result of the state estimation during long-term motions of the legged robot.

BRIEF DESCRIPTION OF THE DRAWINGS

To describe the technical solutions in aspects of this disclosure more clearly, drawings required for describing the aspects are briefly described below. Apparently, the drawings in the following description are merely exemplary aspects of this disclosure, and a person of ordinary skill in the art may further obtain other drawings based on the drawings without creative efforts. The following drawings are not intentionally drawn to scale based on an actual size, and focus on showing the essence of the aspects of this disclosure.

DESCRIPTION OF ASPECTS

Figure 1:
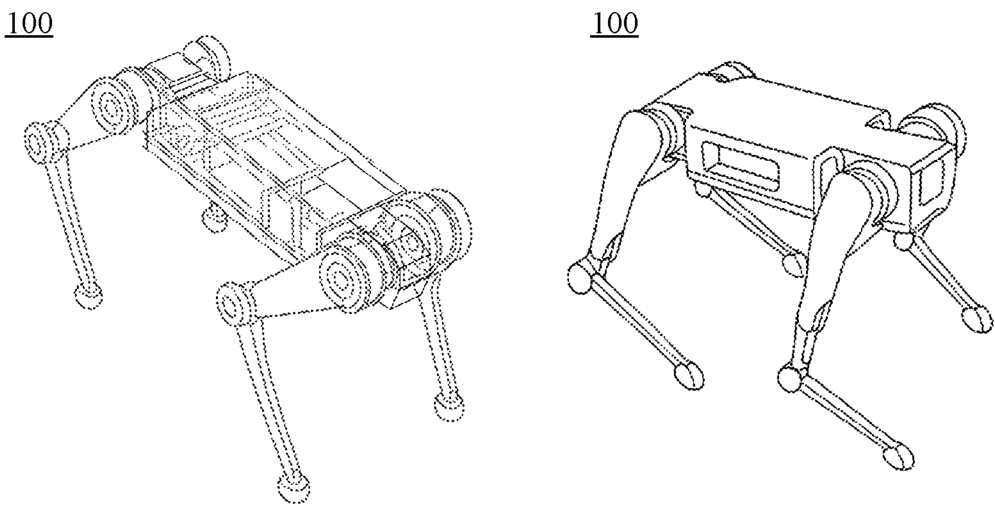
FIG. 1 is a schematic diagram of a legged robot according to an aspect of this disclosure.

The technical solutions in aspects of this disclosure are described below with reference to the drawings. The described aspects are merely some rather than all of the aspects of this disclosure. Other aspects fall within the scope of the this disclosure.

In the description of the aspects of this disclosure, it is to be understood that orientation or position relationships indicated by terms such as "center", "longitudinal", "transverse", "length", "width", "thickness", "up", "down", "front", "back", "left", "right", "vertical", "horizontal", "top", "bottom", "inside", "outside", "clockwise", and "anticlockwise" are based on orientation or position relationships shown in the drawings, and are merely used for ease and brevity of description of the aspects of this disclosure, rather than indicating or implying that the mentioned apparatus or element needs to have a particular orientation or be constructed and operated in a particular orientation. Therefore, such terms are not to be construed as a limitation of the aspects of this disclosure. In addition, terms "first" and "second" are merely used for description, and are not construed as indicating or implying relative importance or implying a quantity of indicated technical features. Thus, features defined by "first" and "second" may explicitly or implicitly include one or more of the features. In the descriptions of the aspects of this disclosure, "a plurality of" means two or more, unless otherwise definitely and specifically defined.

In the descriptions of the aspects of this disclosure, unless otherwise explicitly specified or defined, terms "mount", "connect", and "connection" are to be understood in a broad sense. For example, the connection may be a fixed connection, a detachable connection, or an integral connection; or may be a mechanical connection, an electrical connection, or mutual communication; or may be a direct connection, an indirect connection through an intermediate medium, internal communication between two elements, or an interaction relationship between two elements. A person of ordinary skill in the art may understand specific meanings of the above terms in the aspects of this disclosure based on a specific situation.

In the aspects of this disclosure, unless otherwise explicitly specified and defined, a first feature being "above" or "below" a second feature may include the first feature and the second feature being in direct contact, or may include the first feature and the second feature being not in direct contact but being in contact through another feature therebetween. Moreover, the first feature being "over", "above", and "on" the second feature includes the first feature being directly above or obliquely above the second feature, or merely means that the first feature has a larger horizontal height than the second feature. The first feature being "under", "below", and "underneath" the second feature includes the first feature being directly below or obliquely below the second feature, or merely means that the first feature has a smaller horizontal height than the second feature.

Many different implementations or examples are provided in the following disclosure to implement different structures of the aspects of this disclosure. To simplify the aspects of this disclosure, components and settings in particular examples are described below. They are merely examples and are not intended to limit the aspects of this disclosure. In addition, in the aspects of this disclosure, reference numerals and/or reference letters may be repeated in different examples. The repetition is for simplification and clarity, but does not indicate a relationship between the various implementations and/or settings that are discussed. Moreover, the aspects of this disclosure provide examples of various particular processes and materials, but a person of ordinary skill in the art may be aware of application of another process and/or use of another material.

Although the aspects of this disclosure make various references to specific modules in an apparatus in the aspects of this disclosure, any quantity of different modules may be used and run on a user terminal and/or a server. The modules are merely illustrative, and different modules may be used in different aspects of the apparatus and a method.

In the aspects of this disclosure, a flowchart is used for describing operations performed according to the method and the apparatus in the aspects of this disclosure. It is to be understood that, the above or following operations may not need to be performed in the same order. On the contrary, steps may be performed in a reverse order or simultaneously as required. Moreover, other operations may be added to the processes. Alternatively, one or more operations may be deleted from the processes.

A legged robot in aspects of this disclosure is a legged robot that moves with legs. The legged robot may be biomimetically designed based on animals, to simulate motion patterns of the animals and replicate the motion capabilities of the animals based on engineering technology and scientific research achievements. The legged robot is adapted to various environments (including a structured environment (such as a road, a railway, and a treated flat road surface) and an unstructured environment (such as a mountain land, a swamp, and a rugged road surface)), may adapt to various changes in a terrain and climb over various obstacles, and may effectively reduce the load and improve energy utilization efficiency of a system. The legged robots may be divided into a monopod robot, a bipedal robot, a quadruped robot, a hexapod robot, an octopod robot, and the like based on a quantity of feet. The quadruped robot has a strong motion ability, has higher static stability than the bipedal robot, and moves more simply and flexibly than the hexapod robot and the octopod robot. Therefore, the quadruped robot is a common choice for research on the legged robots. A gait of the quadruped robot may refer to coordination among four robotic legs in time and space in order for the quadruped robot to move continuously. The gait of the quadruped robot may be derived from a gait of a quadruped animal, which may include, but is not limited to, the following three simplified forms: walk, trot, and bound.

A method for controlling a legged robot in the aspects of this disclosure may be based on artificial intelligence (AI). AI involves a theory, a method, a technology, and an application system that uses a digital computer or a machine controlled by the digital computer to simulate, extend, and expand human intelligence, sense an environment, obtain knowledge, and use knowledge to obtain an optimal result. In other words, AI is a comprehensive technology of computer science, which attempts to understand essence of intelligence and produces a new intelligent machine that responds in a manner similar to human intelligence. For example, in the method for controlling a legged robot based on the AI, a motion trajectory and a gait of the legged robot may be planned in a manner like guiding motions of a living animal by a human, so that the motions of the legged robot are more flexible and bionic. By studying design principles and implementation methods of various intelligent machines, AI enables the method for controlling a legged robot in the aspects of this disclosure to have a function of automatically and efficiently designing subsequent motion trajectories and gaits of the legged robot based on a current motion state of the legged robot.

In summary, the solutions included in the aspects of this disclosure relate to technologies such as AI and machine learning. The aspects of this disclosure are further described below with reference to the drawings.

FIG. 1 is a schematic diagram of a legged robot 100 according to an aspect of this disclosure. As shown in FIG. 1, a quadruped robot is used as an example. Left and right figures of FIG. 1 are respectively an internal perspective view and an external structural diagram of the exemplary legged robot.

The exemplary legged robot may move based on four robotic legs. Each robotic leg may include a thigh and a calf and may include at least one joint. For example, each robotic leg may include a plurality of lower limb joints, such as a hip joint having two degrees of freedom and a knee joint having one degree of freedom. The term "joint" in the aspects of this disclosure indicates a movable connection between two or more components of the legged robot. The joint may move under control of a force and a torque outputted by a joint motor. For example, the joint may enable another joint and a linkage mechanism thereof to generate a specific amount of motions in a space through rotation by an angle, thereby changing a pose/motion state of the legged robot 100.

In addition, each robotic leg may be further equipped with a plurality of motors. The motors may be respectively configured to control the hip joint having two degrees of freedom of the quadruped robot and the knee joint having one degree of freedom separately or in combination. The legged robot may be further equipped with various measurement components, such as an inertial measurement unit (IMU) sensor and a joint encoder. The IMU sensor may provide acceleration and pose information of the legged robot in real time, and the joint encoder may provide joint angle information (such as a joint angle and an angular velocity feedback value) of each joint of the legged robot in real time.

Under the control of the plurality of motors mentioned above, the exemplary legged robot may implement various motions, for example, include actions such as flipping or bounding. However, controlling the legged robot to perform the actions usually requires accurate state data. In case of inaccurate state data, it is difficult to implement accurate and flexible control of the legged robot through various control solutions.

The related art provides various means to determine a state (for example, position and pose information) of a legged robot in real time during control of motions of the legged robot. For example, a body state of the legged robot may be estimated by using a plurality of sensors. For example, the industry provides various methods fusing IMU data, joint encoder data, laser data, action capture data, and the like to determine the body state of the legged robot. However, the methods cannot resolve state drift of a sensor state estimator sensing the body during long-term operation, resulting in inevitable error accumulation.

For the above problem, an aspect of this disclosure provides a state estimation method for a legged robot, including: obtaining first sensor information and second sensor information of the legged robot, determining first state information of the legged robot by using a first Kalman filter based on the first sensor information and the second sensor information, and using first state information stored for a period of time as historical information of a second Kalman filter; obtaining third sensor information of the legged robot, and determining second state information of the legged robot by using the second Kalman filter based on the third sensor information and the historical information; updating first state information of the legged robot at a current moment based on the second state information of the legged robot, to determine state information of the legged robot at the current moment.

In another aspect, an aspect of this disclosure further provides a state estimation apparatus for a legged robot, including: a first sensor, configured to obtain first sensor information of the legged robot; a second sensor, configured to obtain second sensor information of the legged robot; a third sensor, configured to obtain third sensor information of the legged robot; a first Kalman filter, configured to determine first state information of the legged robot based on the first sensor information and the second sensor information, and use first state information stored for a period of time as historical information; and a second Kalman filter, configured to determine second state information of the legged robot based on the third sensor information and the historical information, the first Kalman filter being further configured to determine state information of the legged robot at a current moment based on the second state information and first state information of the legged robot at the current moment.

Compared to the related state estimation solution, in aspects of this disclosure, the sensor information of the sensors operating at different frequencies is fused, and problems such as a high delay as a result of fusing different sensor information at a relatively low frequency in the solutions of the related art are addressed by using two Kalman filters, thereby achieving highly real-time multi-sensor state fusion estimation with high robustness and high efficiency, and significantly reducing error accumulation as a result of the state estimation during long-term motions of the legged robot.

Exemplary aspects of this disclosure are further described with reference to FIG. 2 to FIG. 9. The aspects of this disclosure are not limited thereto.

Figure 2:
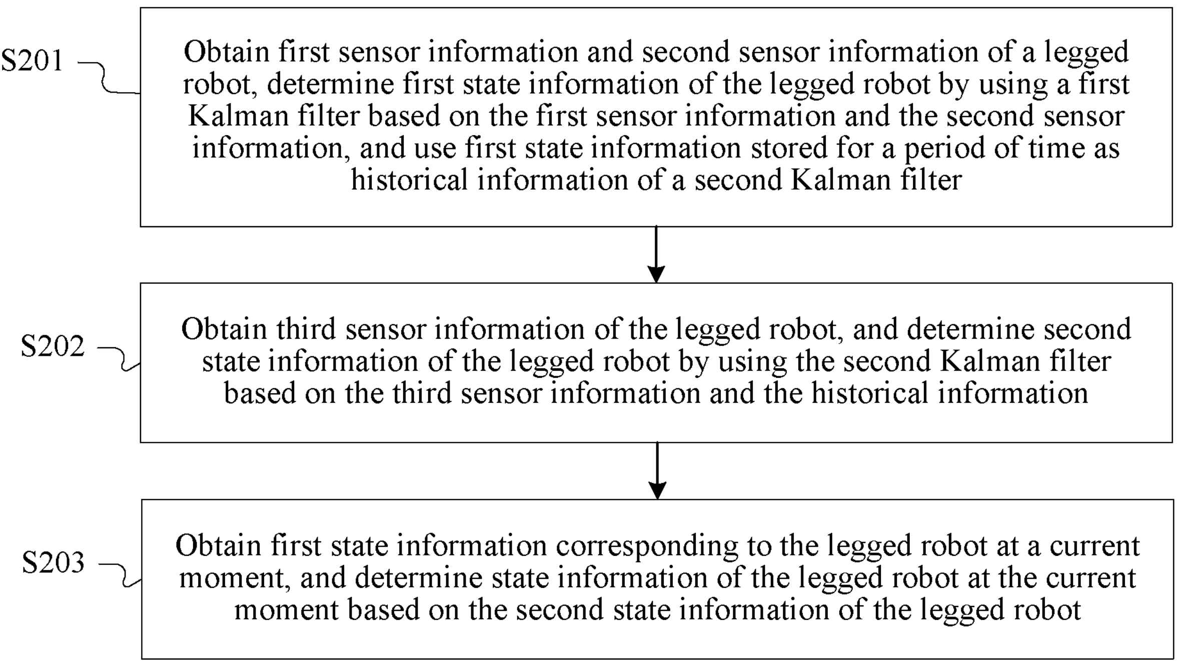
FIG. 2 is a flowchart of a state estimation method for a legged robot according to an aspect of this disclosure.
Figure 3:
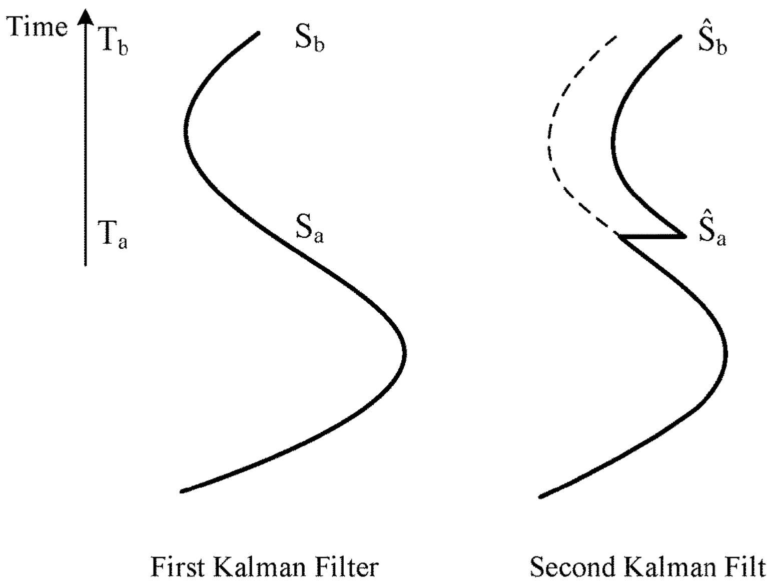
FIG. 3 is a schematic diagram of the state estimation method for a legged robot according to an aspect of this disclosure, schematically showing first state information and second state information.

FIG. 2 is a flowchart of a state estimation method 20 for a legged robot according to an aspect of this disclosure. FIG. 3 is a schematic diagram of the state estimation method 20 for a legged robot according to an aspect of this disclosure, showing first state information and second state information.

The state estimation method 20 for a legged robot in this aspect of this disclosure may include operation S201 to operation S203 shown in FIG. 2. As shown in FIG. 2, the method 20 includes one or all of operation S201 to operation S203, or may further include more operations. An execution subject of operation S201 to operation S203 may be components located on the legged robot (such as sensors and computing components located on the legged robot), or may be components located outside the legged robot (such as sensors and computing components located outside the legged robot). The execution subject of operation S201 to operation S203 is not limited in this aspect of this disclosure. The method 20 may be processed by an apparatus 40 described in detail below.

In an example, the method 20 may be performed by any computing device. The computing device herein may be a terminal or a server. Alternatively, the computing device herein may be executed jointly by the terminal and the server, which is not limited. The terminal may be a smartphone, a computer (such as a tablet computer, a notebook computer, or a desktop computer), a smart wearable device (such as a smartwatch or smart glasses), a smart voice interaction device, a smart home appliance (such as a smart television), a car terminal, an aircraft, or the like. The server may be an independent physical server, a server cluster composed of a plurality of physical servers, a distributed system, or a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. Further, the terminal and the server may be located within or outside a blockchain network, which is not limited. Further, the terminal and the server may alternatively upload any data stored internally to the blockchain network for storage to prevent tampering of the data stored internally and improve data security.

For example, in operation S201, first sensor information and second sensor information of the legged robot are obtained, first state information of the legged robot is determined by using a first Kalman filter based on the first sensor information and the second sensor information, and first state information stored for a period of time is used as historical information of a second Kalman filter.

The first sensor information may be any information collected through a first sensor. In an example, the first sensor information has a timestamp. The first sensor may operate at a first frequency to obtain first sensor information corresponding to a plurality of timestamps in a first timestamp set. That is to say, the first sensor information may include information collected by the first sensor at each timestamp in the first timestamp set. The first frequency may be relatively high, thereby ensuring time relevancy of the first sensor. An exemplary first frequency may be in a range of 0.01 kHZ to 1 kHZ. For example, the first sensor may include at least one of the following devices: a tactile sensor, a force and torque sensor, and an IMU. A type and a specific signal form of the sensor information are not limited in this aspect of this disclosure. In another example, when the legged robot 100 further includes a robotic arm, the first sensor may further include a force and torque sensor corresponding to the robotic arm. When the robotic arm further includes a finger end, the first sensor may further include a tactile sensor and the like of the finger end. In some aspects, the first sensor may be physically attached to the legged robot, and an attachment position thereof may vary with a configuration of the legged robot, which is not limited in this aspect of this disclosure. In some other aspects, the first sensor may alternatively not be physically attached to the legged robot, which is not limited in this aspect of this disclosure.

The second sensor information may be any information collected through a second sensor. In an example, the second sensor information also has a timestamp. The second sensor may operate at a second frequency to obtain second sensor information corresponding to a plurality of timestamps in a second timestamp set. The second sensor information may be used for calculating information about an action and a pose of the legged robot. For example, the second sensor may be a joint encoder, which is configured to collect the second sensor information of the legged robot, thereby obtaining joint angle information (such as a joint angle and an angular velocity feedback value) of each joint of the legged robot. The joint encoder may operate at the second frequency. An exemplary second frequency may be in a range of 0.1 kHZ to 1 kHZ. The second frequency may be slightly lower than the first frequency.

The first Kalman filter may be a standard Kalman filter, or may be an extended Kalman filter. For example, the Kalman filter is an efficient recursive filter (an autoregressive filter), which may estimate a state of the legged robot based on a series of pieces of incomplete measurement information including a noise (such as the first sensor information and the second sensor information). The Kalman filter considers joint distribution at different times based on values of the measurement information at the times, and then generates estimation of unknown variables (for example, the first state information). This is more accurate than an estimation manner based on only a single measured value. The so-called extended Kalman filter is, for example, an extended form of the standard Kalman filter in a nonlinear case, which may perform Taylor expansion on a nonlinear function, omit a high-order term, and retain a first-order term of an expanded term, to implement linearization of a nonlinear function. Although the following examples are described by using the standard Kalman filter as an example, this aspect of this disclosure is not limited thereto.

In a specific implementation, the first sensor information and the second sensor information each have a timestamp. The determining first state information of the legged robot by using a first Kalman filter based on the first sensor information and the second sensor information includes: successively using the first sensor information and the second sensor information having the timestamp as an input of the first Kalman filter; and performing state estimation by using the first Kalman filter to obtain first state information of the legged robot having a timestamp, and storing the first state information having the timestamp as historical information, the first state information including a plurality of state estimation results having timestamps outputted by the first Kalman filter.

In an example, with reference to FIG. 3, it is assumed that the current moment is $T_b$, and the plurality of timestamps fall within a period of time from a moment $T_a$ to the moment $T_b$. The first sensor information and the second sensor information corresponding to each timestamp in the above plurality of timestamps may be successively used as the input of the first Kalman filter to perform the state estimation by using the first Kalman filter, so as to obtain first state information of the legged robot corresponding to each timestamp in the period of time $[T_a, T_b]$. The first state information includes a plurality of state estimation results corresponding to the plurality of timestamps outputted by the first Kalman filter.

In an example, the first state information may be a timing value sequence composed of the following data: a center of mass and foot end-related information corresponding to each time step (each time step corresponds to one timestamp). Each element in the timing value sequence corresponds to one state estimation result. Each element in the timing value sequence may have a plurality of dimensions, which respectively indicate positions of the center of mass and a foot end in an x axis direction, a position of the center of mass in a y axis direction, a position of the center of mass in a z axis direction (a gravity direction), a pitch angle (pitch) of the legged robot, a yaw angle (yaw) of the legged robot, and a roll angle (roll) of the legged robot corresponding to a specific time step, which is not limited in this aspect of this disclosure.

The above process may be performed in real time. In other words, each time first sensor information and second sensor information corresponding to a timestamp are collected, the first sensor information and the second sensor information are inputted into the first Kalman filter to obtain a state estimation result (for example, first state information indicated by a curve in FIG. 3, each point in the curve corresponding to state information at a moment).

For example, at the timestamp $T_a$, a state estimation result outputted by the first Kalman filter is $S_a$. At a timestamp $T_{b-1}$, a state estimation result outputted by the first Kalman filter is $S_{b-1}$. In the following, a term "state estimation results $S_a$ to $S_{b-1}$" includes a state estimation result $S_i$ corresponding to each timestamp $T_i$ in a historical period of time from the moment $T_a$ to the moment $T_{b-1}$ ($T_a<T_i<T_{b-1}$). An exemplary solution of obtaining the first state information by using the first Kalman filter is further described below with reference to examples described in FIG. 4 and FIG. 5, which is not described in detail in this aspect of this disclosure.

Then, the first state information stored for a period of time (for example, the first state estimation results $S_a$ to $S_{b-1}$ corresponding to timestamps in the period of time $[T_a, T_{b-1}]$) may be used as the historical information of the second Kalman filter.

Next, in operation S202, third sensor information of the legged robot is obtained, and second state information of the legged robot is determined by using the second Kalman filter based on the third sensor information and the historical information.

The third sensor information may be any information collected through a third sensor. The third sensor may operate at a third frequency to obtain third sensor information corresponding to one of a plurality of moments within a fixed of period of time. The third frequency may be relatively low, for example, lower than the first frequency. An exemplary third frequency may be in a range of 10 HZ to 50 HZ. An operating frequency and an accuracy of the sensor restrict each other. In other words, a higher operating frequency indicates a lower accuracy. The third sensor information collected by the third sensor has lower time relevancy than that of the first sensor, but has a higher accuracy than that of the first sensor, so that errors do not accumulate with the motions of the legged robot.

The third sensor may include at least one of the following devices: a distance sensor (TOF), a camera or a lens that provides visual information, a radar, a position sensor (such as a GPS sensor), and a laser sensor.

Similarly, the second Kalman filter may be either a standard Kalman filter or an extended Kalman filter. A timestamp corresponding to the third sensor information may be determined, and the historical information and the third sensor information are used as an input of the second Kalman filter; and state estimation is performed by using the second Kalman filter to obtain a state estimation result corresponding to the timestamp corresponding to the third sensor information as the second state information. In addition, in another aspect, to further reduce an amount of computation, only a state estimation result in the above historical information corresponding to the timestamp corresponding to the third sensor information and the third sensor information may be used as the input of the second Kalman filter to perform state estimation by using the second Kalman filter, so as to obtain the state estimation result corresponding to the timestamp corresponding to the third sensor information, and the state estimation result is used as the second state information.

Specifically, the process of performing the state estimation by using the second Kalman filter may be briefly described as follows: First, the state estimation result in the historical information corresponding to the timestamp corresponding to the third sensor information is determined based on the timestamp. The state estimation result corresponding to the timestamp means that a timestamp of the state estimation result corresponding to the timestamp is the same as the timestamp corresponding to the third sensor information. Then, the state estimation is performed by using the second Kalman filter based on the third sensor information and the state estimation result in the historical information corresponding to the timestamp, to obtain the state estimation result corresponding to the timestamp, and the state estimation result is used as the second state information.

For example, refer to FIG. 3. For example, the third sensor is the camera or the lens that provides visual information. The camera or the lens may enable a shutter at the moment $T_a$ to capture an image of the legged robot at the moment $T_a$, then process the image, and finally provide, at the current moment $T_b$, third sensor information corresponding to the moment $T_a$ to the second Kalman filter. At the moment $T_b$, the second Kalman filter may output the state estimation result corresponding to each timestamp in the period of time $T_a$ to $T_{b-1}$ based on the first state information at the moment $T_a$ in combination with the third sensor information at the moment $T_a$.

As shown in FIG. 3, at the moment $T_a$, a state increment $\Delta S$ exists between the state estimation result $S_a$ of the first Kalman filter and a state estimation result $\widehat{S_a}$ of the second Kalman filter, which indicates a difference between the state estimation result $S_a$ of the first Kalman filter and the state estimation result $\widehat{S_a}$ of the second Kalman filter. In an example, the second Kalman filter may combine the state increment $\Delta S$ with first state information $S_b$ corresponding to the legged robot at the current moment $T_b$, to determine state information $\hat{S}_b$ of the legged robot at the current moment. That is to say, the state increment $\Delta S$ is combined with the first state information $S_b$ corresponding to the legged robot at the current moment $T_b$, and the obtained superposition result is used as the state information $\hat{S}_b$ of the legged robot at the current moment.

In addition, in another example, the second Kalman filter may successively correct, based on the state increment $\Delta S$, the state estimation results determined by the first Kalman filter at the timestamps in the period of time $T_a$ to $T_{b-1}$ (the state estimation results determined at the timestamps are denoted as $S_a$ to $S_{b-1}$), to obtain second state information $S_a$ to $\hat{S}_{b-1}$. $\hat{S}_{b-1}$ is a state estimation result corresponding to the moment $T_{b-1}$ estimated based on the third sensor information. For example, the state estimation results in the first state information corresponding to the timestamps may be corrected by using the following formula: $\hat{S}_i = S_i + \Delta S$, where $a<i<b$. In another example, the second Kalman filter may use an offset between the state estimation result $S_a$ of the first Kalman filter corresponding to the moment $T_a$ and the state estimation result $\hat{S}_a$ of the second Kalman filter as an initial value, and iteratively update the state estimation results corresponding to the timestamps in the period of time $T_a$ to $T_{b-1}$, to obtain the second state information $\hat{S}_a$ to $\hat{S}_{b-1}$. In another example, the second Kalman filter may further successively update the state estimation results corresponding to the timestamps in the period of time $T_a$ to $T_{b-1}$ based on the state estimation result $\hat{S}_a$ of the second Kalman filter in combination with a leg kinematics model or a dynamics model of the legged robot, to obtain the second state information $\hat{S}_a$ to $\hat{S}_{b-1}$, which is not limited in this aspect of this disclosure.

The dynamics model is a mathematical equation that describes a relationship between a force and a motion of a robot. For an example, the dynamics model may be a virtual model controller (VMC) model, a spring loaded inverted pendulum (SLIP) model, and a floating body model.

An exemplary solution of obtaining the second state information by using the second Kalman filter is further described below with reference to examples described in FIG. 4 and FIG. 5, which is not described in detail in this aspect of this disclosure.

In operation S203, first state information corresponding to the legged robot at a current moment is obtained, and state information of the legged robot at the current moment is determined based on the second state information of the legged robot.

Referring to FIG. 3, a description is provided still by using the example that the current moment is $T_b$. To obtain the state $S_b$ at the current moment $T_b$, at the moment $T_b$, the first sensor may collect the first sensor information corresponding to the moment $T_b$, and the joint encoder may collect the second sensor information corresponding to the moment $T_b$. In this case, the first Kalman filter may use the first sensor information and the second sensor information corresponding to the moment $T_b$ as the input, to obtain a first state estimation result $S_b$ corresponding to the moment $T_b$, and correct the first state estimation result $S_b$ by using the state increment $\Delta S$ in operation S202, to obtain $\hat{S}_b$. Error accumulation in $S_b$ is eliminated through the state increment $\Delta S$, thereby obtaining relatively accurate $\hat{S}_b$. In other words, the state information of the legged robot at the current moment is information fused by the first Kalman filter and the second Kalman filter, which has high accuracy.

According to the method 20 in this aspect of this disclosure, the first sensor information and the second sensor information of the different sensors operating at different frequencies are fused, and problems such as a low frequency and a high delay during the fusion of the different sensor information are resolved by using two Kalman filters, thereby achieving highly real-time multi-sensor state fusion estimation with high robustness and high efficiency, and significantly reducing error accumulation as a result of the state estimation during long-term motions of the legged robot. In particular, the method 20 simplifies analysis and adjustment of the Kalman filters, which reduces a running time. In addition, the second Kalman filter may be directly turned off when the third sensor information is unavailable without affecting operation of the entire state estimation apparatus.

Figure 4:
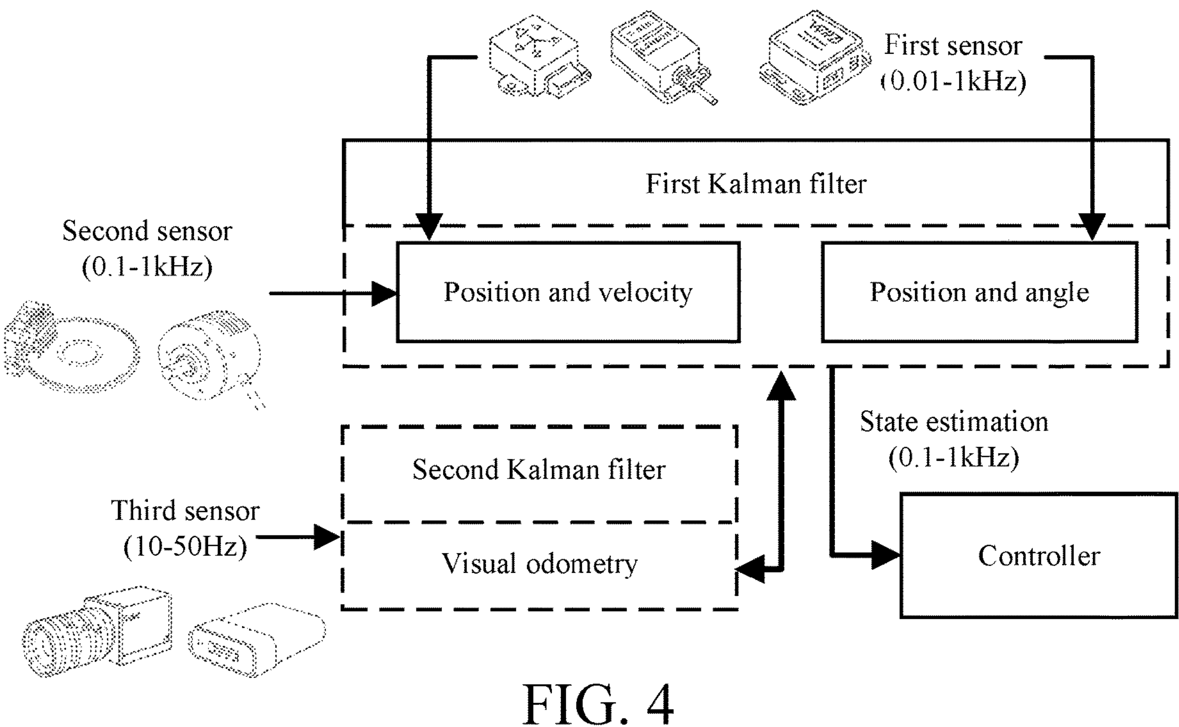
FIG. 4 is a partial structural diagram of a state estimation apparatus of a legged robot according to an aspect of this disclosure.

In FIG. 4, Some details of operation S201 to operation S203 are further described in combination with the legged robot 100 described in FIG. 1 and the method 20 described in FIG. 2 to FIG. 3. FIG. 4 is a partial structural diagram of a state estimation apparatus 40 for a legged robot according to an aspect of this disclosure.

As shown in FIG. 4, the state estimation apparatus 40 for a legged robot may include the first sensor, the second sensor, the third sensor, the first Kalman filter, and the second Kalman filter. The first Kalman filter may operate in a high-frequency low-delay state, and the second Kalman filter may operate in a low-frequency high-delay state.

The first sensor is configured to obtain the first sensor information of the legged robot corresponding to each timestamp in the first timestamp set and the first sensor information corresponding to the legged robot at the current moment. It may be recognized from the above that the first sensor in the legged robot may include the IMU sensor. The IMU sensor may collect pose information and the acceleration of the legged robot at the first frequency at a plurality of moments, which are used as first sensor information corresponding to the moments. The IMU sensor may be configured to obtain, at a plurality of discrete moments, a triaxial pose angle (or an angular speed) and an acceleration of each joint corresponding to the discrete moments. Data outputted by the IMU sensor includes timestamps, three-dimensional accelerations, three-dimensional angular velocities, orientations, and the like, which is not limited in this aspect of this disclosure.

For example, the joint encoder serving as the second sensor is configured to obtain the second sensor information of the legged robot corresponding to each timestamp in the second timestamp set and obtain the second sensor information corresponding to the legged robot at the current moment. In an example, the joint encoder may collect joint angle information (such as a joint angle and an angular velocity feedback value) of each joint on each robotic leg of the legged robot at each moment, which is used as the second sensor information corresponding to the moment. For example, the joint encoder may be configured to obtain, for a plurality of different timestamps, angles q[ ] and joint angular velocities $\dot{q}$[ ] of all joints corresponding to the timestamps.

The first Kalman filter is configured to determine the first state information of the legged robot based on the first sensor information and the second sensor information corresponding to the plurality of timestamps. In an example, the first Kalman filter further includes an observation model and a prediction model. The observation model is configured to perform state observation, through which state observation data may be obtained. The prediction model is configured to perform state prediction, through which state prediction data may be obtained. As described in detail below, the prediction model is configured to obtain a prediction state and a corresponding covariance through the first sensor information, and the observation model is configured to obtain an observation state and a corresponding covariance through the second sensor information. This aspect of this disclosure is not limited thereto.

Specifically, it is assumed that the first timestamp set and the second timestamp set both include a timestamp $T_i$. That the first Kalman filter performs, for the timestamp $T_i$, state estimation to obtain the state estimation result corresponding to the timestamp $T_i$ includes: inputting first sensor information corresponding to the timestamp $T_i$ to the observation model to obtain state observation data corresponding to the timestamp $T_i$; inputting a state estimation result corresponding to a previous timestamp $T_{i-1}$ of the timestamp $T_i$ and the first sensor information corresponding to the timestamp $T_i$ to the prediction model to obtain state prediction data corresponding to the timestamp $T_i$; and correcting the state prediction data corresponding to the timestamp $T_i$ by using a measured value obtained based on the second sensor information corresponding to the timestamp $T_i$, to obtain the state estimation result corresponding to the timestamp $T_i$. For example, the measured value is obtained through kinematics calculation by using the second sensor information corresponding to the timestamp $T_i$.

In an example, it is assumed that the observation model is based on an observation matrix H, and is configured to implement a mapping from an observation quantity to state observation data. State observation data corresponding to the timestamp $T_i$ is denoted as $Y_i$. The observation model may be represented as $Y_i=Hx_i$, where $x_i$ is an observation quantity corresponding to the timestamp $T_i$, which is determined based on the first sensor information. In another example, the prediction model may be represented as $\hat{x}_i=Ax_{i-1}+Bu_{i-1}+m_i$, where $m_i\sim N(0, Q_i)$ is a predicted noise, A is a state transition matrix, and B is a control matrix.

In a specific implementation, a general principle for the first Kalman filter to determine the first state information of the legged robot at the moment $T_i$ is as follows:

First, the IMU sensor in the legged robot may be called to collect the first sensor information of the legged robot at the moment $T_i$. The first sensor information at the moment $T_i$ includes acceleration information (which may include accelerations of the legged robot in a plurality of directions (such as a vertical direction and a horizontal direction)) and pose information at the moment $T_i$. In addition, the second sensor serving as the joint encoder may be called to determine joint angle information (such as a joint angle and an angular velocity feedback value) of each joint of the legged robot at the moment $T_i$.

Then the pose information and the joint angle information at the moment $T_i$ may be inputted into the observation model to calculate the state observation data. The state observation data may include values of a plurality of state observation quantities. The values of the plurality of state observation quantities include observation positions of the foot ends of the robotic legs of the legged robot at the moment $T_i$ and observation positions of the center of mass of the legged robot at the moment $T_i$. In an example, the observation model may output a set of position and pose data identified by timestamps. For example, the position and pose data may include values of the center of mass and the foot ends on coordinate axes X, Y, and Z in a world coordinate system/body coordinate system, orientation data (indicated by a quaternion), and velocities of the legged robot 100 along the coordinate axes X, Y, and Z in the world coordinate system/body coordinate system.

Moreover, at least one of a state estimation result of the legged robot at a previous moment $T_{i-1}$ of the moment $T_i$ and the acceleration information and the pose information of the legged robot at the moment $T_i$ may be inputted into the prediction model to calculate the state prediction data at the moment $T_i$. The state prediction data may include values of a plurality of state prediction quantities and a priori covariance. The values of the plurality of state prediction quantities include predicted positions of the foot ends of the robotic legs of the legged robot at the moment $T_i$, predicted positions of the center of mass of the legged robot at the moment $T_i$, a velocity of the center of mass of the legged robot at the moment $T_i$, and the like.

Next, the first Kalman filter may determine the state estimation result corresponding to the moment $T_i$ based on the state observation data at the moment $T_i$ and the state prediction data at the moment $T_i$. The first Kalman filter is intended to correct the state prediction data by using the state observation data and the measured values to obtain a corresponding state estimation result when the state observation data, the measured values, and the state prediction data at the moment $T_j$ are provided.

The third sensor is configured to obtain the third sensor information of the legged robot corresponding to one of the plurality of timestamps. It may be recognized from the above that the third sensor in the legged robot may include the camera or the lens that provides visual information (which is referred to as a visual sensor below). A visual odometry may convert image information collected by the visual sensor into position information and pose information of the legged robot in the world coordinate system. The third sensor is, for example, a binocular single-channel camera, and takes a photograph with 1456*1088 pixels each time. Each pixel in the photograph is indicated by eight bits. The third sensor may trigger photographing every 0.1 s. This aspect of this disclosure is not limited thereto. The third sensor may alternatively trigger photographing at a longer or shorter time interval. The third sensor alternatively is, for example, a monocular single-channel camera, and takes a photograph with a resolution of 640×576 or 512×512. Each pixel in the photograph is indicated by 16 bits. This aspect of this disclosure is not limited thereto.

The second Kalman filter is configured to determine the second state information of the legged robot based on the third sensor information corresponding to one of the plurality of timestamps and the first state information. In an example, the second Kalman filter further includes the visual odometry. The visual odometry may determine an orientation and a position of the legged robot by analyzing a series of image sequences.

In a specific implementation, a general principle for the second Kalman filter to determine the second state information of the legged robot at the timestamp $T_i$ is as follows:

First, the visual sensor may be called to collect third sensor information of the legged robot at a timestamp $T_{i-c}$. It may be understood from the above that the data collected by the third sensor has a delay. The calculation of the third sensor information collected at the timestamp $T_{i-c}$ may not be completed by the visual odometry until the timestamp $T_i$, and measurement information at the timestamp $T_{i-c}$ is obtained by parsing. In an example, a maximum delay value of the third sensor information is a duration corresponding to c timestamps. Similarly, the measurement information may include values of a plurality of state observation quantities. The values of the plurality of state observation quantities include positions of the center of mass of the legged robot at the timestamp $T_{i-c}$, a velocity of the center of mass of the legged robot at the timestamp $T_{i-c}$, and the like.

Then, historical information may be obtained from the first Kalman filter, which includes state estimation results calculated by the first Kalman filter at the timestamp $T_{i-c}$ to the timestamp $T_i$. That is to say, a historical data window of the first Kalman filter is the duration corresponding to c timestamps. The second Kalman filter may determine a corrected state estimation result at the timestamp $T_{i-c}$ as second state information at the timestamp $T_{i-c}$ based on the measurement information obtained by the visual odometry at the timestamp $T_{i-c}$ and the state estimation result at the timestamp $T_{i-c}$ in the historical information from the first Kalman filter. Based on the corrected state estimation result at the timestamp $T_i$, the second Kalman filter may predict a state estimation result at a timestamp $T_{i-c+1}$. The above operation is repeated, until the second Kalman filter calculates the state estimation result at the timestamp $T_i$ as the second state information.

Further, the first Kalman filter is further configured to determine the state information of the legged robot at the current moment based on the second state information and the first state information of the legged robot at the current moment.

As shown above, it is assumed that the current moment is $T_b$, the above first sensor has collected the first sensor information at the moment $T_b$, and the joint encoder has collected the second sensor information at the moment $T_b$. In addition, the second Kalman filter may be further configured to calculate the state increment $\Delta S$ based on the first state estimation result $S_a$ provided by the first Kalman filter and the third sensor information corresponding to the timestamp $T_a$. The state increment indicates a difference between the first state estimation result $S_a$ provided by the first Kalman filter and the third sensor information corresponding to the timestamp $T_a$. In this case, the first Kalman filter may calculate the state information corresponding to the moment $T_b$ based on the above information. Compared to the state information at the moment $T_b$ estimated by the first Kalman filter directly by using the state estimation result estimated by the first Kalman filter at $T_{b-1}$, the state information at the moment $T_b$ estimated by using the state increment $\Delta S$ from the second Kalman filter is more accurate.

As shown in FIG. 4, the first Kalman filter may output the state information of the legged robot at the current moment to a controller at the first frequency (for example, 0.1 kHz to 1 kHz shown in FIG. 4). Moreover, the second Kalman filter may output the second state information to the first Kalman filter at the second frequency (for example, 10 HZ to 50 HZ shown in FIG. 4). Therefore, the first Kalman filter may adjust the state information at the current moment based on the second state information at an interval of 0.02 s to 0.1 s, thereby avoiding error accumulation.

According to the apparatus 40 in this aspect of this disclosure, the first sensor information and the second sensor information of the different sensors operating at different frequencies are fused, and problems such as different frequencies and different delays during the fusion of the different sensor information are resolved by using two Kalman filters, thereby achieving highly real-time multi-sensor state fusion estimation with high robustness and high efficiency, and significantly reducing error accumulation as a result of the state estimation during long-term motions of the legged robot. In particular, the apparatus 40 for performing the method 20 simplifies analysis and adjustment of the Kalman filters, which reduces a running time. In addition, the second Kalman filter may be directly turned off when the third sensor information is unavailable without affecting operation of the entire state estimation apparatus.

Figure 5:
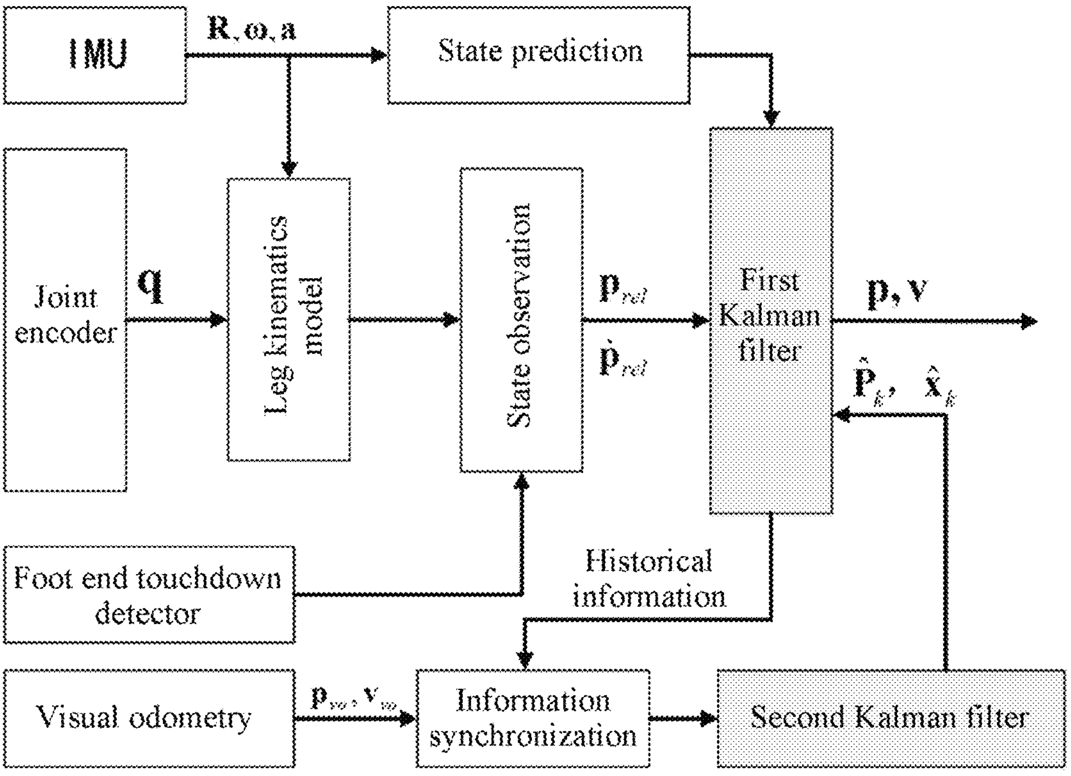
FIG. 5 is a schematic diagram of performing the method by the state estimation apparatus for a legged robot according to an aspect of this disclosure.
Figures 6, 7:
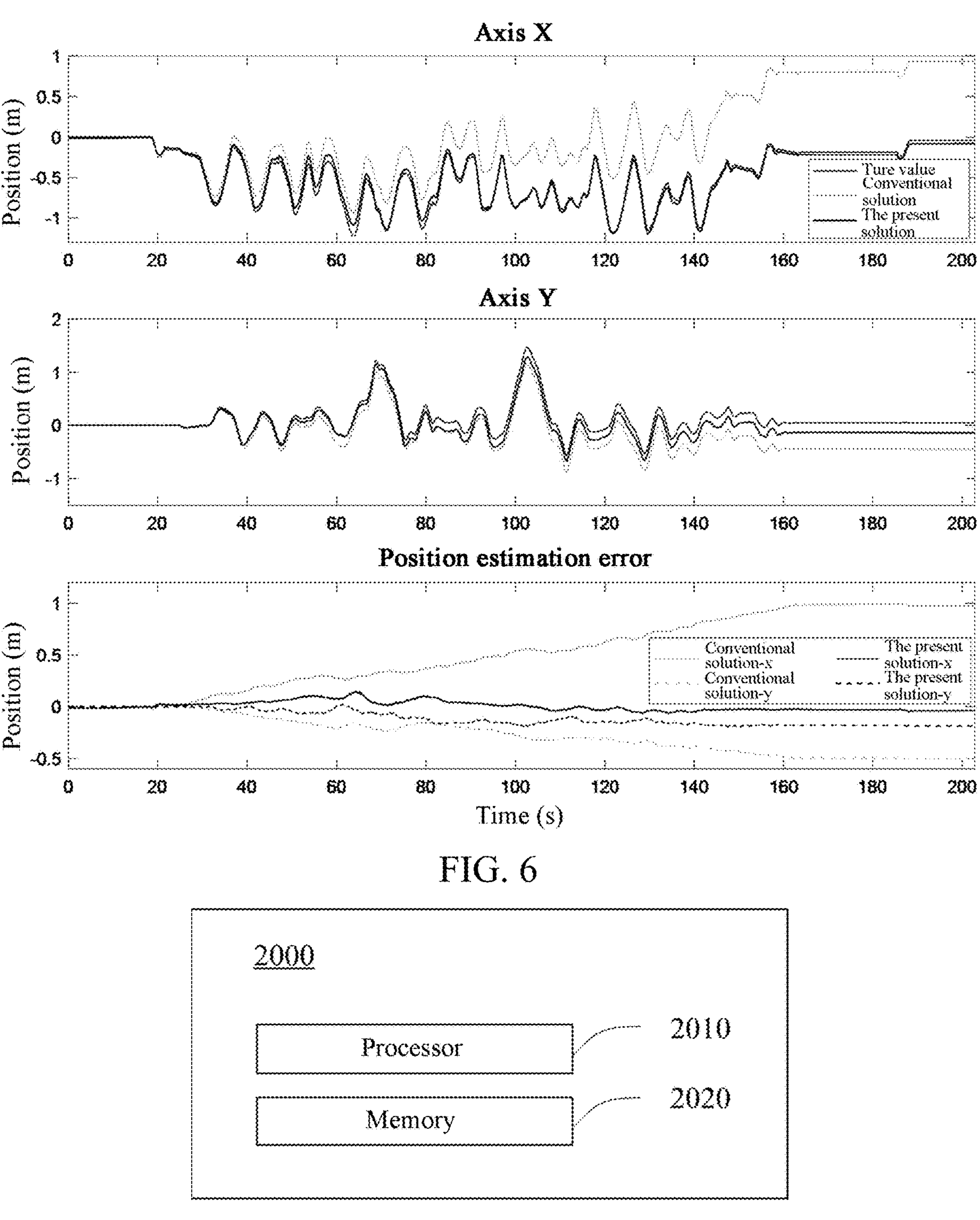
FIG. 6 is an execution effect comparison diagram between the method according to an aspect of this disclosure and a related solution.
FIG. 7 is a schematic diagram of an electronic device according to an aspect of this disclosure.

In FIG. 5 and FIG. 6, some details of performing the above operations by the above components are further described in combination with the legged robot 100 described in FIG. 1, the method 20 described in FIG. 2 to FIG. 3, and the apparatus 40 described in FIG. 4. FIG. 5 is a schematic diagram of performing the method 20 by the state estimation apparatus 40 for a legged robot according to an aspect of this disclosure. FIG. 6 is an execution effect comparison diagram between the method 20 according to an aspect of this disclosure and a related solution.

Referring to FIG. 5, the state quantities may be observed by using the prediction model (this process is also referred to as state prediction) in combination with the above content. An input of the prediction model may include the first sensor information. The first sensor information includes a rotation matrix R between the world coordinate system and the body coordinate system (which is denoted as ${}^{W}R_B$ below and indicates a rotation matrix of the body coordinate system B relative to the world coordinate system W), an angular velocity ω in the body coordinate system, an acceleration a in the body coordinate system, and the like. Let an output x of the prediction model be $x=[p^T\ v^T\ p_1^T\ p_2^T\ p_3^T\ p_4^T]^T$.

p indicates a position of the center of mass of the body of the legged robot in the world coordinate system, v indicates a velocity of the center of mass of the body in the world coordinate system, $p_{f_i}$ indicates a foot end position in the world coordinate system, $v_{f_i}$ indicates a foot end velocity in the world coordinate system (it is assumed that the foot end velocity is zero, that is, no sliding exists between the foot ends and the ground), and $f_i$ is an index of the robotic leg. The legged robot 100 shown in FIG. 1 is used as an example. When $f_i$=1, $p_{f_i}$ indicates a foot end position of a left front leg in the world coordinate system, and $v_{f_i}$ indicates a foot end velocity of the left front leg in the world coordinate system. When $f_i$=2, $p_{f_i}$ indicates a foot end position of a right front leg in the world coordinate system, and $v_{f_i}$ indicates a foot end velocity of the right front leg in the world coordinate system. When $f_i$=3, $p_{f_i}$ indicates a foot end position of a left rear leg in the world coordinate system, and $v_{f_i}$ indicates a foot end velocity of the left rear leg in the world coordinate system. When $f_i$=4, $p_{f_i}$ indicates a foot end position of a right rear leg in the world coordinate system, and $v_{f_i}$ indicates a foot end velocity of the right rear leg in the world coordinate system.

Specifically, the prediction model may be configured to predict a body position, a body velocity, and the foot end position of the legged robot respectively based on a first equation (1) to a third equation (3) described below to obtain the above x. The first equation (1) is also referred to as a discrete prediction equation for the body position of the legged robot. The first equation (2) is also referred to as a discrete prediction equation for the body velocity of the legged robot. The first equation (3) is also referred to as a discrete prediction equation for the foot end position of the legged robot.

$$p_{k+1} = p_k + v_k dt + \frac{1}{2}\left({}^{W}R_B a_k + g\right)dt^2 \tag{1}$$

$$v_{k+1} = v_k + \left({}^{W}R_B a_k + g\right)dt \tag{2}$$

$$p_{f_i,k+1} = p_{f_i,k} \tag{3}$$

$a_k$ is the acceleration in the body coordinate system, dt is a time step, g indicates an acceleration of gravity, and a subscript k indicates an index of the time step.

Referring to FIG. 5, the state quantities may be further observed by using the observation model (this process is also referred to as state observation) in combination with the above content. The observation model may perform state observation at least partially based on the leg kinematics model shown in FIG. 5. The observation model may use the first sensor information and the second sensor information as an input, and use the state observation data as an output.

The second sensor information includes joint angle information q. The state observation data includes a position $p_{rel}$ of the foot end in the world coordinate system relative to the center of mass and a velocity $\dot{p}_{rel}$ of the foot end in the world coordinate system relative to the center of mass. The observation model may further use a foot end touchdown detector as the input to obtain more accurate foot end observation data.

Specifically, the leg kinematics model is obtained through mathematical modeling of the legs of the legged robot. For example, an MIT Cheetah kinematics modeling technology may be used. The leg kinematics model is configured to indicate a relationship between a motion state of a leg end and a motion state of the joint of the legged robot, such as a relative position and velocity relationship between the center of mass and the foot end of the legged robot, which is configured to eliminate a state drift between the center of mass and the foot end. For example, in an specific implementation, the determining first state information of the legged robot by using a first Kalman filter based on the first sensor information and the second sensor information further includes: determining motion information of the legged robot based on the second sensor information and the leg kinematics model of the legged robot; and determining the first state information of the legged robot by using the first Kalman filter at least partially based on the motion information.

In an example, the observation model may calculate a relative position measurement residual between the body and the foot end of the legged robot and a relative velocity measurement residual between the body and the foot end of the legged robot based on the leg kinematics model of the legged robot, and use the relative position measurement residual between the body and the foot end of the legged robot and the relative velocity measurement residual (that is, the above motion information) between the body and the foot end of the legged robot as the state observation data.

The observation model may correspondingly calculate the measurement residuals by using a fourth equation (4) and a fifth equation (5). The fourth equation (4) is configured to calculate the relative position measurement residual between the body and the foot end of the legged robot, and the fifth equation (5) is configured to calculate the relative velocity measurement residual between the body and the foot end of the legged robot. $\omega_b$ is an angular velocity in the body coordinate system.

$$e_{p,f_i} = P_{rel}(q_{f_i}, {}^W R_B) - (p_{f_i} - p) \tag{4}$$

$$e_{v,f_i} = \dot{p}_{rel}(q_{f_i}, \dot{q}_{f_i}, \omega_B, {}^W R_B) - (-v) \tag{5}$$

As described above, the first Kalman filter may be configured to determine the first state information of the legged robot based on the first sensor information and the second sensor information corresponding to the plurality of timestamps. It is assumed that the first Kalman filter obtains, at a moment $T_k$ (corresponding to a $k^{th}$ time step), a control input $u_k$ of each joint motor at a moment $T_k$ and first sensor information $z_k$ collected by the first sensor at the moment $T_k$. In addition, the first Kalman filter further learns a priori state $$\hat{x}_{k-1}^-$$

corresponding to the moment $T_{k-1}$. The first Kalman filter is intended to estimate a state mean μ and σ covariance a based on the above values. A state-space equation of the first Kalman filter may be shown as a sixth equation (6) and a seventh equation (7).

$$x_k = Ax_{k-1} + Bu_k + m_k \tag{6}$$

$$z_k = Cx_{k-1} + n_k \tag{7}$$

$m_k \sim N(0,Q_k)$ is a predicted noise, $n_k \sim N(0,R_k)$ is an observed noise, A is a state transition matrix, B is a control matrix, and C is an observation matrix. The first Kalman filter may process the state observation data and the state prediction data by using an eighth equation (8) to a twelfth equation (12) to obtain a state estimation result corresponding to the time step k through fusion.

$$\hat{x}_k^- = A\hat{x}_{k-1} + Bu_k + m_k \tag{8}$$

$$\hat{P}_k^- = A\hat{p}_{k-1}A^T + Q \tag{9}$$

$$K_k = \hat{P}_k^- C^T \left[C\hat{P}_k^- C^T + R\right]^{-1} \tag{10}$$

$$\hat{x}_k = \hat{x}_k^- + K_k(z_k - C\hat{x}_k^-) \tag{11}$$

$$\hat{P}_k = (I - K_k C)\hat{P}_k^- \tag{12}$$

P is an error covariance matrix, of which an initial value may be set to an empirical value or any value. K is a Kalman gain matrix, I is an identity matrix, and $x^-$ indicates a priori value of x. $\hat{x}$ indicates an estimated value of x. That is to say, $\hat{P}^-_k$ identifies a priori estimated value of $P_k$.

$$\hat{x}_k^-$$

identifies a priori estimated value of $x_k$. A value of $$z_k - C\hat{x}_k^-$$

is a combination of the relative position measurement residual between the body and the foot end of the legged robot calculated by using the fourth equation (4) and the relative velocity measurement residual between the body and the foot end of the legged robot calculated by using the fifth equation (5). $z_k$ is also referred to as a measured value, which is obtained through kinematics calculation of the second sensor information.

$$C\hat{x}_k^-$$

is also referred to as an observation quantity or state observation data. Therefore, $$z_k - C\hat{x}_k^-$$

may be defined as a residual. Therefore, the first Kalman filter may estimate the state estimation result corresponding to the moment $T_k$, and may use state estimation results corresponding to a plurality of time steps as the first state information, which is outputted to the second Kalman filter after information synchronization. In an example, the state estimation result corresponding to the moment $T_k$ estimated by the first Kalman filter includes a posteriori state $\hat{x}_k$ and a posteriori covariance $\hat{P}_k$ corresponding to the moment $T_k$.

Still referring to FIG. 5, it is assumed that the third sensor is the above visual sensor. Third sensor information $z'_s$ outputted by the visual sensor is $z'_s=[p_{vo}^T\ v_{vo}^T]$ where $p_{vo}$ is a position of the body in the world coordinate system measured by the visual sensor at a time step s, and $v_{vo}$ is a velocity of the body in the world coordinate system measured by the visual sensor at the time step s. Therefore, a state-space equation corresponding to the second Kalman filter may be shown as a thirteenth equation (13).

$$z'_s = C'_s x_s + n'_s \tag{13}$$

$n'_k \sim N(0, R'_k)$, s=k−N. In other words, the third sensor information has an output with a delay of N time steps (timestamps) relative to the above information of the first Kalman filter. Therefore, information synchronization may be performed on the third sensor information and the first state information to obtain a measurement error for correcting the first state information.

Specifically, as described above, the visual data has a specific delay. Therefore, preferably, time synchronization may be performed on the first state information and the error covariance matrix and the third sensor information $z'_s$ and the error covariance matrix corresponding to the third sensor information. In other words, as described above, third sensor information corresponding to the time step s, a state estimation result of the first Kalman filter corresponding to the time step s, and the error covariance matrix may be used as iterative parameters in subsequent equations, and are fused based on the principle of the above Kalman filter.

For example, the third sensor may obtain, by using a fourteenth equation (14), a relative position measurement residual $p_{vo}-p$ and a relative velocity measurement residual $v_{vo}-v$ for correcting the first state information.

$$e_{p_{vo}} = \begin{bmatrix} p_{vo} - p \\ v_{vo} - v \end{bmatrix} \tag{14}$$

The second Kalman filter may then fuse the first state information and the third sensor information after the time synchronization based on a fifteenth equation (15) to a seventeenth equation (17) to obtain the second state information. A relative position measurement residual $e_{p_{vo}}$ and a relative velocity measurement residual $e_{v_{vo}}$ may be used for forming $$z'_s - C\hat{x}'^-_s$$

in the seventeenth equation.

$$K'_s = \hat{P}'^-_s C^T\left[C\hat{P}'^-_s C^T + R\right]^{-1} \tag{15}$$

$$\hat{x}'_s = \hat{x}'^-_s + K'_s(z'_s - C\hat{x}'^-_s) \tag{16}$$

$$\hat{P}'_s = (I - K'_s C)\hat{P}'^-_s \tag{17}$$

P' is an error covariance matrix used by the second Kalman filter. K' is a Kalman gain matrix used by the second Kalman filter, I is the identity matrix, and $x^-$ indicates the priori value of x.

$$\hat{x}'^-_s$$

identifies a priori estimated value of the state estimation value $\hat{x}'_s$ outputted by the second Kalman filter. As described above, $$\hat{x}'^-_s$$

equals to a posteriori state $\hat{x}_s$ outputted by the first Kalman filter at the time step s, and $\hat{P}'^-_s$ equals to a posteriori covariance $\hat{P}_s$ outputted by the first Kalman filter at the time step s. The posteriori state and the posteriori covariance obtained by the first Kalman filter are used as the priori state and the priori covariance of the second Kalman filter for fusion with the observation information of the second Kalman filter, thereby obtaining the state estimation result corresponding to the time step s as the second state information.

After receiving second state information corresponding to the moment $T_k$, the first Kalman filter may further determine the state estimation result corresponding to the moment $T_k$ based on the above first equation (1) to twelfth equation (12) in combination with the first sensor information and the second sensor information corresponding to the moment $T_k$.

In this case, the first Kalman filter may combine, based on a state increment ΔS between $\hat{x}'_s$ and $$\hat{x}'^-_s,$$

the state increment ΔS to the state estimation result corresponding to the first Kalman filter at the moment $T_k$, to correct the state estimation result at the time step k.

In addition, in some other examples, the second Kalman filter may output the state estimation result corresponding to the moment $T_k$ estimated from the state estimation result corresponding to the time step s as the second state information to the first Kalman filter through N times of repeated iteration, to correct the current state information. This aspect of this disclosure is not limited thereto.

FIG. 6 shows true value data of an action capture system, estimation results of a related method, and three curves corresponding to the estimation results obtained by using method 20. All horizontal axes indicate time and all vertical axes indicating position data. After free motions of legged robot for 200 seconds, in directions X and Y, position error accumulation decreases by 96.08% and 62.52% respectively, and a root mean square error decreases by 92.94% and 58.63% respectively. In addition, a root mean square error of a velocity decreases by 31.05% and 16.47% respectively. It may be recognized that the method 20 can significantly reduce the error accumulation after the visual data is fused.

According to the apparatus 40 in this aspect of this disclosure, the first sensor information and the second sensor information of the different sensors operating at different frequencies are fused, and problems such as different frequencies and different delays during the fusion of the different sensor information are resolved by using two Kalman filters, thereby achieving highly real-time multi-sensor state fusion estimation with high robustness and high efficiency, and significantly reducing error accumulation as a result of the state estimation during long-term motions of the legged robot. In particular, the apparatus 40 for performing the method 20 simplifies analysis and adjustment of the Kalman filters, which reduces a running time. In addition, the second Kalman filter may be directly turned off when the third sensor information is unavailable without affecting operation of the entire state estimation apparatus 40.

An aspect of this disclosure further provides a legged robot, including a memory and a processor, the memory having a computer program stored therein, and the processor, when executing the computer program, implementing the steps in the above method aspects.

An aspect of this disclosure further provides a computer-readable storage medium configured to store a computer program, the computer-readable storage medium being applicable to a legged robot, and the computer program causing the legged robot to implement the corresponding processes in the state estimation method in the aspects of this disclosure. For brevity, details are not described herein.

An aspect of this disclosure further provides a computer program product, including computer instructions, the computer instructions being stored in a computer-readable storage medium. A processor of a legged robot reads the computer instructions from the computer-readable storage medium. The processor executes the computer instructions, so that the legged robot performs the corresponding processes in the state estimation method in the aspects of this disclosure. For brevity, details are not described herein.

An aspect of this disclosure further provides a computer program, including computer instructions, the computer instructions being stored in a computer-readable storage medium. A processor of a legged robot reads the computer instructions from the computer-readable storage medium. The processor executes the computer instructions, so that the legged robot performs the corresponding processes in the state estimation method in the aspects of this disclosure. For brevity, details are not described herein.

According to another aspect of this aspect of this disclosure, an electronic device is provided, which is configured to implement the method in the aspects of this disclosure. FIG. 7 is a schematic diagram of an electronic device 2000 according to an aspect of this disclosure.

As shown in FIG. 7, the electronic device 2000 may include one or more processors 2010 and one or more memories 2020. The memory 2020 has computer-readable code stored therein. The computer-readable code, when run by the one or more processors 2010, may perform the above method.

The processor in this aspect of this disclosure may be an integrated circuit chip, and has a signal processing capability. The above processor may be a general-purpose processor, a digital signal processor (DSP), an application-specific integrated circuit (ASIC), a field programmable gate array (FPGA), or another programmable logical device, discrete gate or transistor logical device, or discrete hardware component. The processor may implement or perform the methods, the operations, and the logical block diagrams disclosed in the aspects of this disclosure. The general-purpose processor may be a microprocessor, or the processor may be any processor, and may have an X86 architecture or an ARM architecture.

The exemplary aspects of the aspects of this disclosure may be implemented in hardware or special-purpose circuitry, software, firmware, logic, or any combination thereof. Some aspects may be implemented in the hardware, while others may be implemented in the firmware or the software that may be executed by a controller, a microprocessor, or another computing device. When the aspects of the aspects of this disclosure are illustrated or described as block diagrams, flowcharts, or some other graphical representations, it is to be understood that the blocks, apparatuses, systems, techniques, or methods described herein may be implemented as non-limiting examples in hardware, software, firmware, special-purpose circuitry or logic, general-purpose hardware, a controller, or another computing device, or some combinations thereof.

Figure 8:
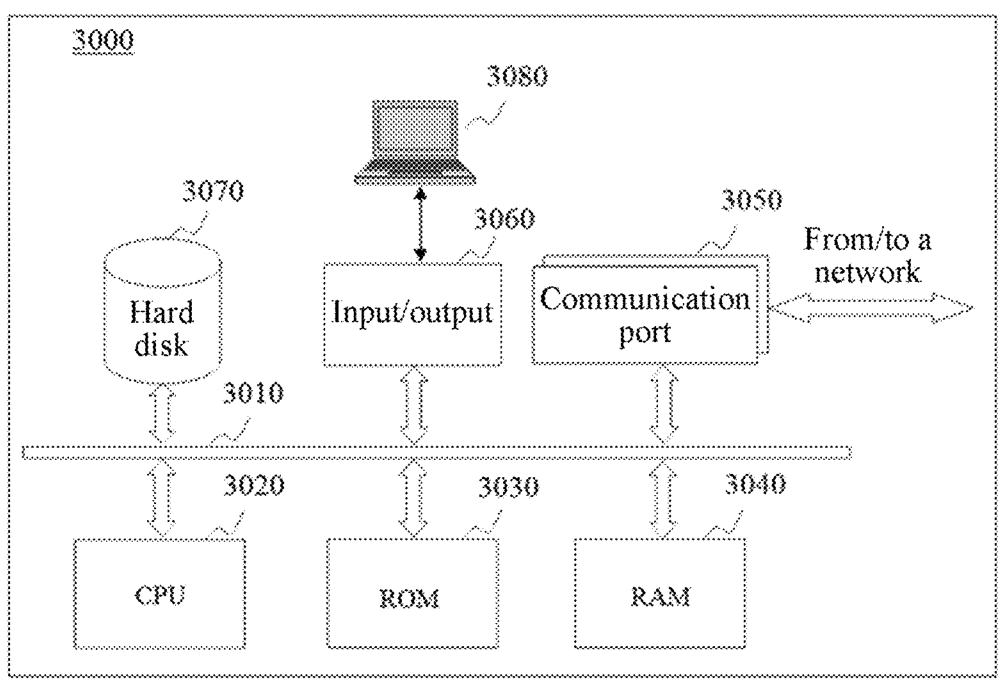
FIG. 8 is a schematic diagram of an architecture of an exemplary computing device according to an aspect of this disclosure.

For example, the methods or the apparatuses in the aspects of this disclosure may alternatively be implemented by using the architecture of the computing device 3000 shown in FIG. 8. As shown in FIG. 8, the computing device 3000 may include a bus 3010, one or more CPUs 3020, a read-only memory (ROM) 3030, a random access memory (RAM) 3040, a communication port 3050 connected to a network, an input/output component 3060, a hard disk 3070, and the like. The storage device in the computing device 3000, such as the ROM 3030 or the hard disk 3070, may store various data or files used during the processing and/or communication of the methods provided in the aspects of this disclosure and the program instructions executed by the CPU. The computing device 3000 may further include a user interface 3080. The architecture shown in FIG. 8 is merely exemplary, and one or more components of the computing device shown in FIG. 8 may be omitted depending on a practical need during implementation of different devices.

Figure 9:
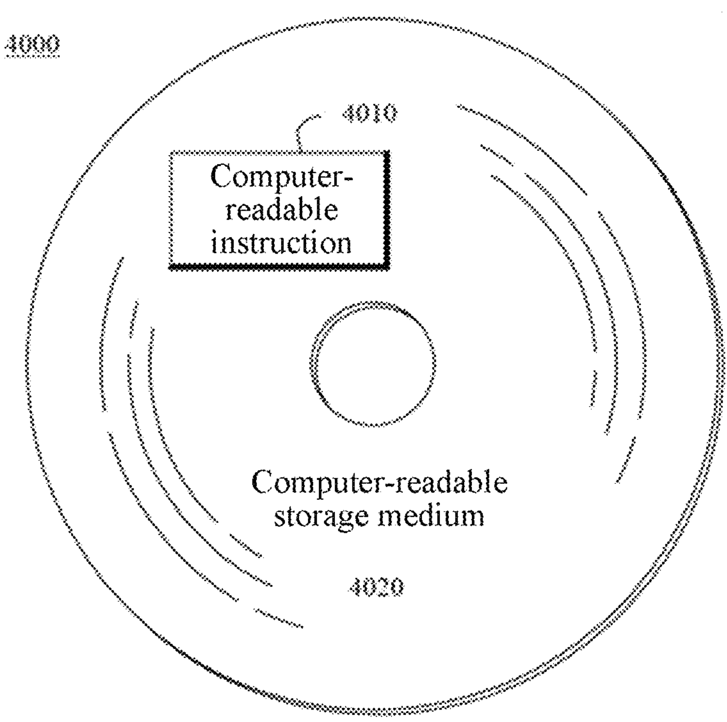
FIG. 9 is a schematic diagram of a storage medium according to an aspect of this disclosure.

According to another aspect of this aspect of this disclosure, a computer-readable storage medium, such as a non-transitory computer-readable storage medium, is further provided. FIG. 9 is a schematic diagram of a storage medium 4000 according to an aspect of this disclosure.

As shown in FIG. 9, a computer-readable storage medium 4020 has computer-readable instructions 4010 stored therein. The computer-readable instructions 4010, when executed by a processor, may perform the methods in the aspects of this disclosure described with reference to the above drawings. The computer-readable storage medium in this aspect of this disclosure may be a volatile memory or a non-volatile memory, or may include both the volatile memory and the non-volatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM, which is used as an external cache. By way of example and not limitation, many forms of RAMs, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DR RAM) may be used. The memory in the methods described in this specification is intended to include, but is not limited to the memories and any other suitable types.

An aspect of this disclosure further provides a computer program product or a computer program, including computer instructions, the computer instructions being stored in a computer-readable storage medium. A processor of a computer device reads the computer instructions from the computer-readable storage medium. The processor executes the computer instructions, so that the computer device performs the methods in the aspects of this disclosure.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

In some embodiments, obtaining the first model from the model storage device may be understood as communicating with or accessing the first model in the model storage device.

The flowcharts and the block diagrams in the drawings illustrate system architectures, functions, and operations that may be implemented by using the system, the method, and the computer program product in the aspects of this disclosure. In this regard, each block in the flowcharts or the block diagrams may represent a module, a program segment, or part of code. The module, the program segment, or the part of the code includes one or more executable instructions for implementing specified logical functions. In some implementations used as substitutes, functions annotated in the blocks may alternatively occur in a sequence different from that annotated in the drawings. For example, depending on functions involved, two blocks represented in succession may actually be executed in parallel, or may sometimes be executed in reverse order. Each block of the block diagrams and/or the flowcharts and combinations of blocks in the block diagrams and/or the flowcharts may be implemented by a dedicated hardware-based system configured to perform specified functions or operations, or may be implemented in a combination of dedicated hardware and computer instructions.

Exemplary aspects of the aspects of this disclosure may be implemented in hardware or special-purpose circuitry, software, firmware, logic, or any combination thereof. Some aspects may be implemented in the hardware, while others may be implemented in the firmware or the software that may be executed by a controller, a microprocessor, or another computing device. When the aspects of the aspects of this disclosure are illustrated or described as block diagrams, flowcharts, or some other graphical representations, it is to be understood that the blocks, apparatuses, systems, techniques, or methods described herein may be implemented as non-limiting examples in hardware, software, firmware, special-purpose circuitry or logic, general-purpose hardware, a controller, or another computing device, or some combinations thereof.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The exemplary aspects of this disclosure described in detail above are merely illustrative and are not restrictive. Various modifications and combinations may be made to the aspects or the features thereof without departing from the principle and spirit of the aspects of this disclosure, and such modifications fall within the scope of this disclosure.

What is claimed is:

1. A state estimation method for controlling a motor of a legged robot, the method comprising:
- receiving first sensor information from a first sensor of the legged robot at a first observation frequency and second sensor information from a second sensor of the legged robot at a second observation frequency;
- determining, via a first Kalman filter, first state information of the legged robot for a period of time based on the first sensor information and the second sensor information, the first state information indicating first position information of a body of the legged robot, first velocity information of the body of the legged robot, and leg position information of legs of the legged robot in a world coordinate system;
- receiving third sensor information from a third sensor of the legged robot at a third observation frequency that is less than the first observation frequency and the second observation frequency, the third sensor information indicating second position information of the body of the legged robot and second velocity information of the body of the legged robot in the world coordinate system;
- determining, via a second Kalman filter, second state information of the legged robot based on the third sensor information and the first state information for the period of time; and
- determining a position of the legged robot and a velocity of the legged robot at a current time through updating a subset of the first state information of the legged robot corresponding to the current time based on the second state information of the legged robot,
- wherein the motor of the legged robot is controlled based on the position of the legged robot and the velocity of the legged robot at the current time.

2. The method according to claim 1, wherein
- the second sensor is a joint encoder, and
- the determining the first state information includes:
  - determining motion information of the legged robot based on the second sensor information and a leg kinematics model of the legged robot; and
  - determining the first state information of the legged robot via the first Kalman filter at least partially based on the motion information.

3. The method according to claim 1, wherein
- the first sensor information and the second sensor information each have a timestamp, and
- the determining the first state information includes:

successively inputting the first sensor information and the second sensor information into the first Kalman filter;

performing state estimation via the first Kalman filter to obtain the first state information of the legged robot having a timestamp; and storing the first state information having the timestamp as historical information of the second Kalman filter, the first state information including a plurality of state estimation results having timestamps outputted by the first Kalman filter.

4. The method according to claim 3, wherein the determining the second state information comprises:

determining a timestamp corresponding to the third sensor information;

inputting the historical information corresponding to the timestamp of the third sensor information and the third sensor information into the second Kalman filter; and performing state estimation via the second Kalman filter to obtain a state estimation result corresponding to the timestamp of the third sensor information, the second state information including the state estimation result corresponding to the timestamp.

5. The method according to claim 4, wherein the performing the state estimation via the second Kalman filter comprises:

determining a state estimation result in the historical information corresponding to the timestamp based on the timestamp corresponding to the third sensor information; and performing the state estimation via the second Kalman filter based on the third sensor information and the state estimation result in the historical information corresponding to the timestamp, to obtain the state estimation result corresponding to the timestamp.

6. The method according to claim 5, wherein the updating the subset of the first state information comprises:

superposing a state increment of the second state information relative to the first state information to the subset of the first state information of the legged robot corresponding to the current time, to determine the position of the legged robot and the velocity of the legged robot at the current time.

7. The method according to claim 1, wherein the first Kalman filter comprises a prediction model and an observation model, the prediction model being configured to obtain a prediction state and a corresponding covariance through the first sensor information, and the observation model being configured to obtain an observation state and a corresponding covariance through the second sensor information.

8. The method according to claim 5, wherein the performing the state estimation via the second Kalman filter comprises:

storing a posteriori state and a posteriori covariance obtained by the first Kalman filter within an interval of a historical data window that corresponds to a maximum delay value of the third sensor information; and fusing a priori state corresponding to the posteriori state, a priori covariance corresponding to the posteriori covariance, and observation information of the second Kalman filter to obtain the state estimation result corresponding to the timestamp.

9. The method according to claim 7, wherein the observation model is configured to perform state observation at least partially based on a leg kinematics model of the legged robot, and the leg kinematics model is configured to indicate a relative position and velocity relationship between a center of mass and a foot end of the legged robot.

10. The method according to claim 9, wherein the observation model is configured to calculate a relative position measurement residual between the body and the foot end of the legged robot and a relative velocity measurement residual between the body and the foot end of the legged robot based on the leg kinematics model of the legged robot; and the relative position measurement residual between the body and the foot end of the legged robot and the relative velocity measurement residual between the body and the foot end of the legged robot is included in state observation data.

11. The method according to claim 5, further comprising:

calculating accumulated errors for correcting state estimation information of the first Kalman filter based on the second position information of the body of the legged robot and the second velocity information of the body of the legged robot in the world coordinate system corresponding to the timestamp of the third sensor information.

12. The method according to claim 1, wherein the first sensor includes an inertial measurement unit (IMU) sensor, the second sensor includes a joint encoder, and the third sensor includes at least one of a distance sensor, a camera, a radar, a position sensor, or a laser sensor.

13. The method according to claim 12, wherein the first observation frequency ranges from 0.1 kilohertz (kHz) to 1.0 kHz, the second observation frequency ranges from 0.1 kHz to 1.0 kHz, and the third observation frequency ranges from 10 Hz to 50 Hz.

14. A state estimation apparatus for controlling a motor of a legged robot, the state estimation apparatus comprising:

processing circuitry configured to:

receive first sensor information from a first sensor of the legged robot at a first observation frequency and second sensor information from a second sensor of the legged robot at a second observation frequency;

determine, via a first Kalman filter, first state information of the legged robot for a period of time based on the first sensor information and the second sensor information, the first state information indicating first position information of a body of the legged robot, first velocity information of the body of the legged robot, and leg position information of legs of the legged robot in a world coordinate system;

receive third sensor information from a third sensor of the legged robot at a third observation frequency that is less than the first observation frequency and the second observation frequency, the third sensor information indicating second position information of the body of the legged robot and second velocity information of the body of the legged robot in the world coordinate system;

determine, via a second Kalman filter, second state information of the legged robot based on the third sensor information and the first state information for the period of time; and determine a position of the legged robot and a velocity of the legged robot at a current time through an update of a subset of the update-first state information of the legged robot corresponding to the current time based on the second state information of the legged robot, wherein the motor of the legged robot is controlled based on the position of the legged robot and the velocity of the legged robot at the current time.

15. The state estimation apparatus according to claim 14, wherein the second sensor is a joint encoder, and the processing circuitry is configured to:

determine motion information of the legged robot based on the second sensor information and a leg kinematics model of the legged robot; and determine the first state information of the legged robot via the first Kalman filter at least partially based on the motion information.

16. The state estimation apparatus according to claim 14, wherein the first sensor information and the second sensor information each have a timestamp, and the processing circuitry is configured to:

successively input the first sensor information and the second sensor information into the first Kalman filter;

perform state estimation via the first Kalman filter to obtain the first state information of the legged robot having a timestamp; and store the first state information having the timestamp as historical information of the second Kalman filter, the first state information including a plurality of state estimation results having timestamps outputted by the first Kalman filter.

17. The state estimation apparatus according to claim 16, wherein the processing circuitry is configured to:

determine a timestamp corresponding to the third sensor information;

input the historical information corresponding to the timestamp of the third sensor information and the third sensor information into the second Kalman filter; and perform state estimation via the second Kalman filter to obtain a state estimation result corresponding to the timestamp of the third sensor information, the second state information including the state estimation result corresponding to the timestamp.

18. The state estimation apparatus according to claim 17, wherein the processing circuitry is configured to:

determine a state estimation result in the historical information corresponding to the timestamp based on the timestamp corresponding to the third sensor information; and perform the state estimation via the second Kalman filter based on the third sensor information and the state estimation result in the historical information corresponding to the timestamp, to obtain the state estimation result corresponding to the timestamp.

19. A legged robot, comprising:

a first sensor configured to obtain first sensor information of the legged robot;

a second sensor configured to obtain second sensor information of the legged robot;

a third sensor configured to obtain third sensor information of the legged robot; and the state estimation apparatus according to claim 14.

20. A non-transitory computer-readable storage medium storing instructions which, when executed by a processor, cause the processor to perform a state estimation method for controlling a motor of a legged robot, the method comprising:

receiving first sensor information from a first sensor of the legged robot at a first observation frequency and second sensor information from a second sensor of the legged robot at a second observation frequency;

determining, via a first Kalman filter, first state information of the legged robot for a period of time based on the first sensor information and the second sensor information, the first state information indicating first position information of a body of the legged robot, first velocity information of the body of the legged robot, and leg position information of legs of the legged robot in a world coordinate system;

receiving third sensor information from a third sensor of the legged robot at a third observation frequency that is less than the first observation frequency and the second observation frequency, the third sensor information indicating second position information of the body of the legged robot and second velocity information of the body of the legged robot in the world coordinate system;

determining, via a second Kalman filter, second state information of the legged robot based on the third sensor information and the first state information for the period of time; and determining a position of the legged robot and a velocity of the legged robot at a current time through updating a subset of the first state information of the legged robot corresponding to the current time based on the second state information of the legged robot, wherein the motor of the legged robot is controlled based on the position of the legged robot and the velocity of the legged robot at the current time.

* * * * *